United States Patent

Sauber

Patent Number: 5,452,871
Date of Patent: Sep. 26, 1995

[54] SUPPORT BRACKET FOR COMMUNICATION CABLE

[76] Inventor: Charles J. Sauber, 10 N. Sauber Rd., Virgil, Ill. 60182

[21] Appl. No.: 207,594

[22] Filed: Mar. 30, 1994

[51] Int. Cl.$^6$ .................................................. F16L 3/08
[52] U.S. Cl. .................. 248/74.1; 174/45 R; 174/149 R; 248/219.4
[58] Field of Search ................ 248/68.1, 74.1, 248/63, 65, 71, 219.4; 174/149 R, 149 B, 148, 150, 45 R

[56] References Cited

U.S. PATENT DOCUMENTS

| | | | |
|---|---|---|---|
| 559,066 | 4/1896 | Shickluna | 248/219.4 |
| 1,121,513 | 12/1914 | Lench | 248/219.4 X |
| 2,849,777 | 9/1958 | Ridgers | 248/74.1 X |
| 3,264,405 | 8/1966 | Fiero | 174/158 R |
| 3,884,442 | 5/1975 | Breeden | 174/149 R X |

FOREIGN PATENT DOCUMENTS 530721  3/1955  Italy ..................... 174/158 R

Primary Examiner—J. Franklin Foss
Attorney, Agent, or Firm—Leydig, Voit & Mayer, Ltd.

[57] ABSTRACT

An improved support bracket which is adapted to be mounted on a utility pole for supporting communication cable which is an integrally formed pair of arms in a generally V shape having outer ends terminating in a pair of reversely curved diverging mounting flanges that receive fastening means for attaching to the pole and the apex portion of the arms has first and second transverse clamping members, one of the clamping members being fixed to the arms and the other clamping member being adjustably movable to form a jaw for holding and clamping a cable between the clamping members. The clamping members are preferably held in pre-assembled form with screw fasteners for ease of use and time savings by installers. An elongated extension arm bracket is reversibly securable to the fixed one of the clamping members and receives a similar movable clamping member at its free end to hold a cable.

3 Claims, 7 Drawing Sheets

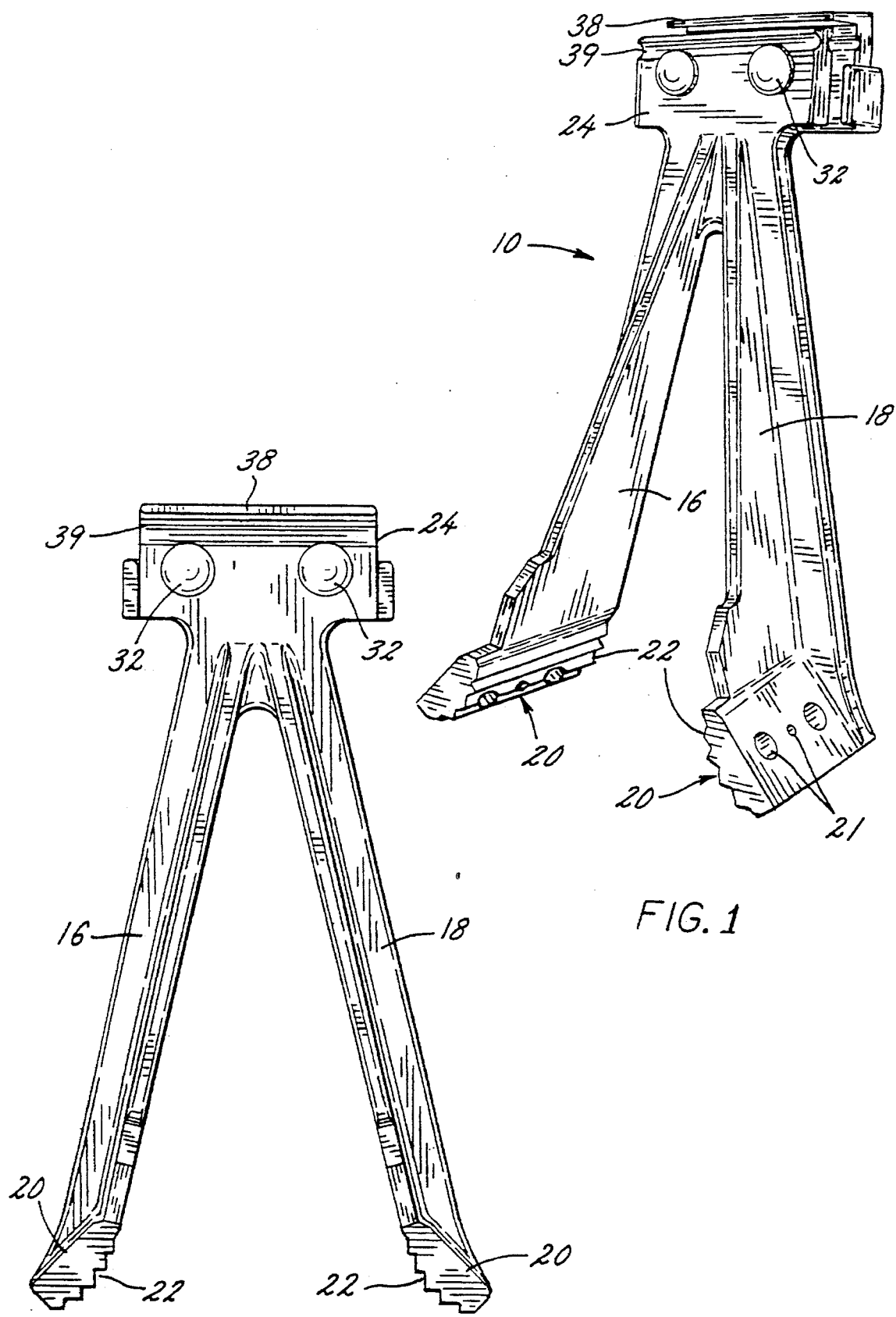

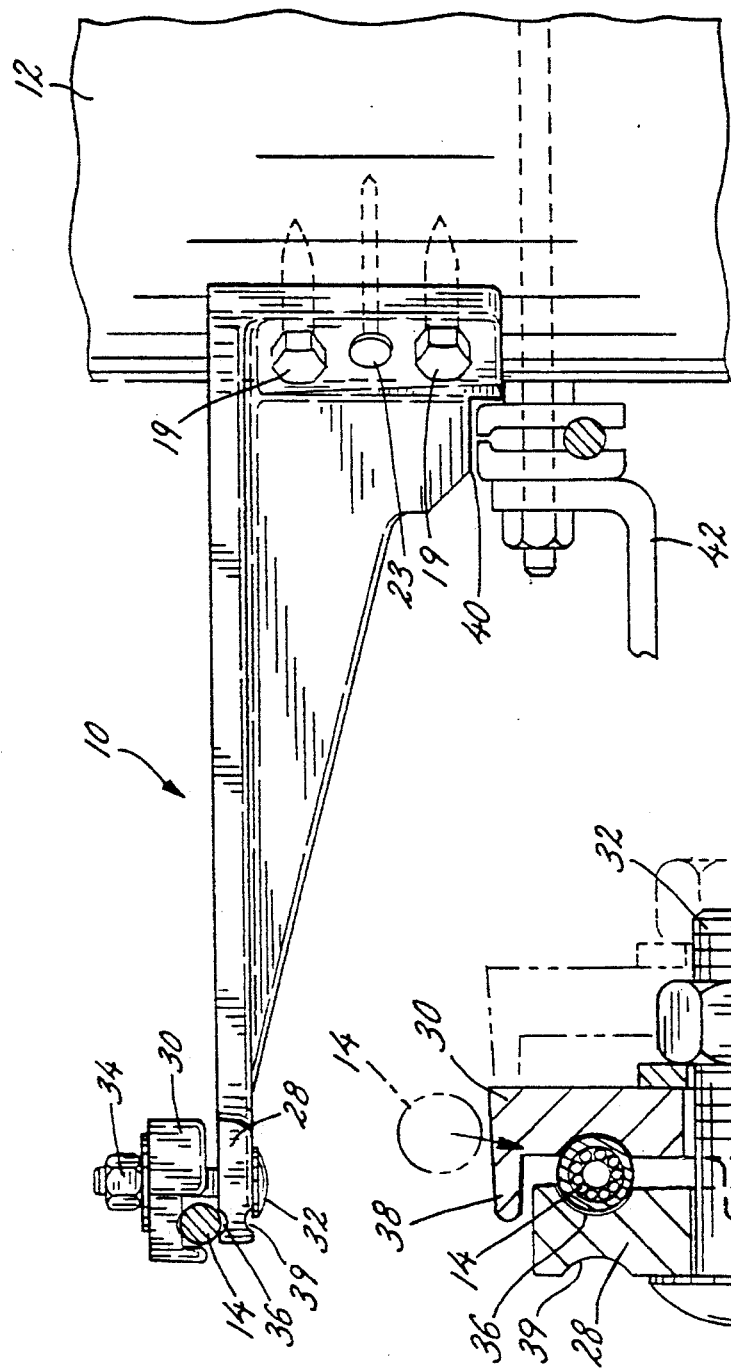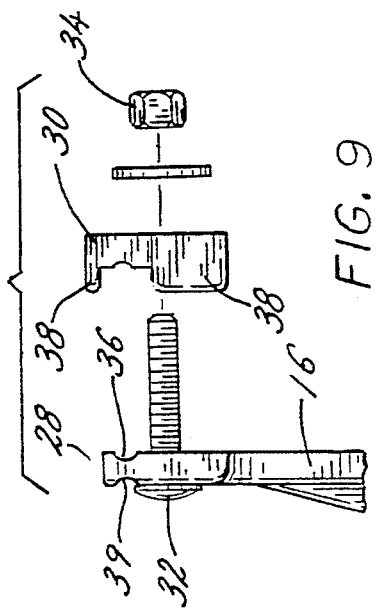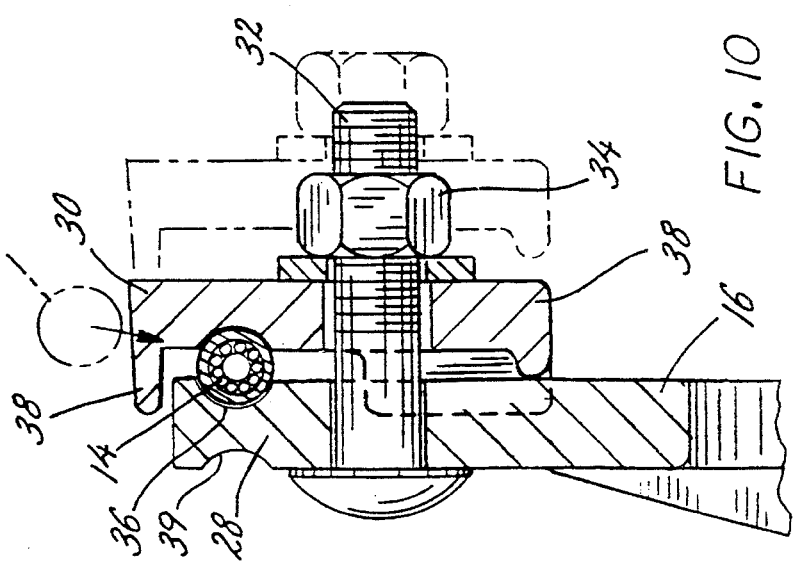

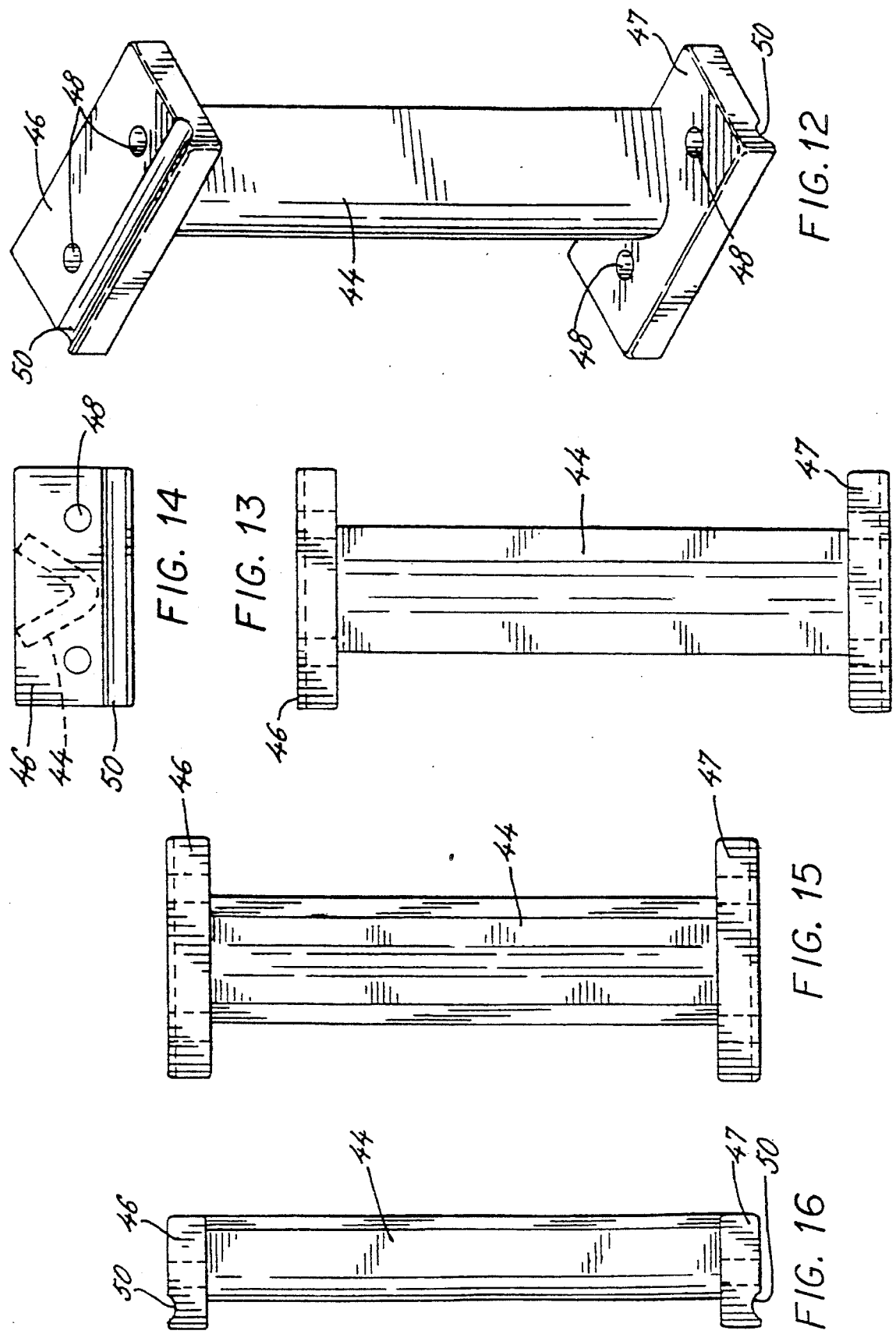

SUPPORT BRACKET FOR COMMUNICATION CABLE

FIELD OF THE INVENTION

The present invention relates generally to electrical cable support brackets and more particularly to an improved cable support bracket mountable to poles and the like for supporting cables or conductors such as used, for example, with cable T.V.

BACKGROUND OF THE INVENTION

With the growing area of cable T.V. networks, conductor cable has to be strung throughout many areas and it is desirable to utilize existing utility poles for carrying such cable as well as other electrical lines. These utility poles already in place have various different brackets used for supports which need to be avoided and the poles themselves have varying diameters which make it difficult to devise a bracket that will avoid the existing encumbrances on the pole yet fit the various sizes of poles that are in place.

OBJECTS OF THE INVENTION

Accordingly, it an object of the present invention to provide an improved cable support bracket mountable to utility poles or the like which overcomes the difficulties and problems attendant with encumbrances existing on the poles and is relatively simple to install and saves time, costs and renders installation of the cable to the bracket easy and more convenient.

Another object of the present invention is to provide a cable support bracket which can be installed on different sizes of poles without the need for movable mounting parts or varying inventories of bracket sizes.

It is still another object of the present invention to provide a cable support bracket which is essentially preassembled in respect to the cable holding or clamping device and is, therefore, easy to use without having to watch out for small or loose parts needed for assembly.

BRIEF DESCRIPTION OF THE DRAWINGS

Other objects an advantages of the present invention will be apparent from the foregoing description and upon reference to the accompanying drawings in which:

FIG. 1 is a perspective view of a cable support bracket in accordance with the present invention;

FIG. 2 is a bottom plan view of the cable support bracket shown in FIG. 1;

FIG. 8 is a side view of the support bracket as shown in FIG. 7;

FIG. 9 is a fragmentary exploded view of the clamping arrangement;

FIG. 10 is a view taken along the line 10—10 of FIG. 7;

FIG. 12 is a perspective view of the extension bracket;

FIG. 13 is a front elevation view thereof;

FIG. 14 is a top plan view thereof;

FIG. 15 is a rear elevation view thereof; and

FIG. 16 is a side elevation view thereof.

While the invention will be described in connection with a particular preferred embodiment, it will be understood that it is not intended to limit the invention to the particular embodiment. On the contrary, it is intended to cover all alternatives, modification and equivalents as may be included within the spirit and scope of the invention as defined by the appended claims.

DETAILED DESCRIPTION

Figures 3, 4:
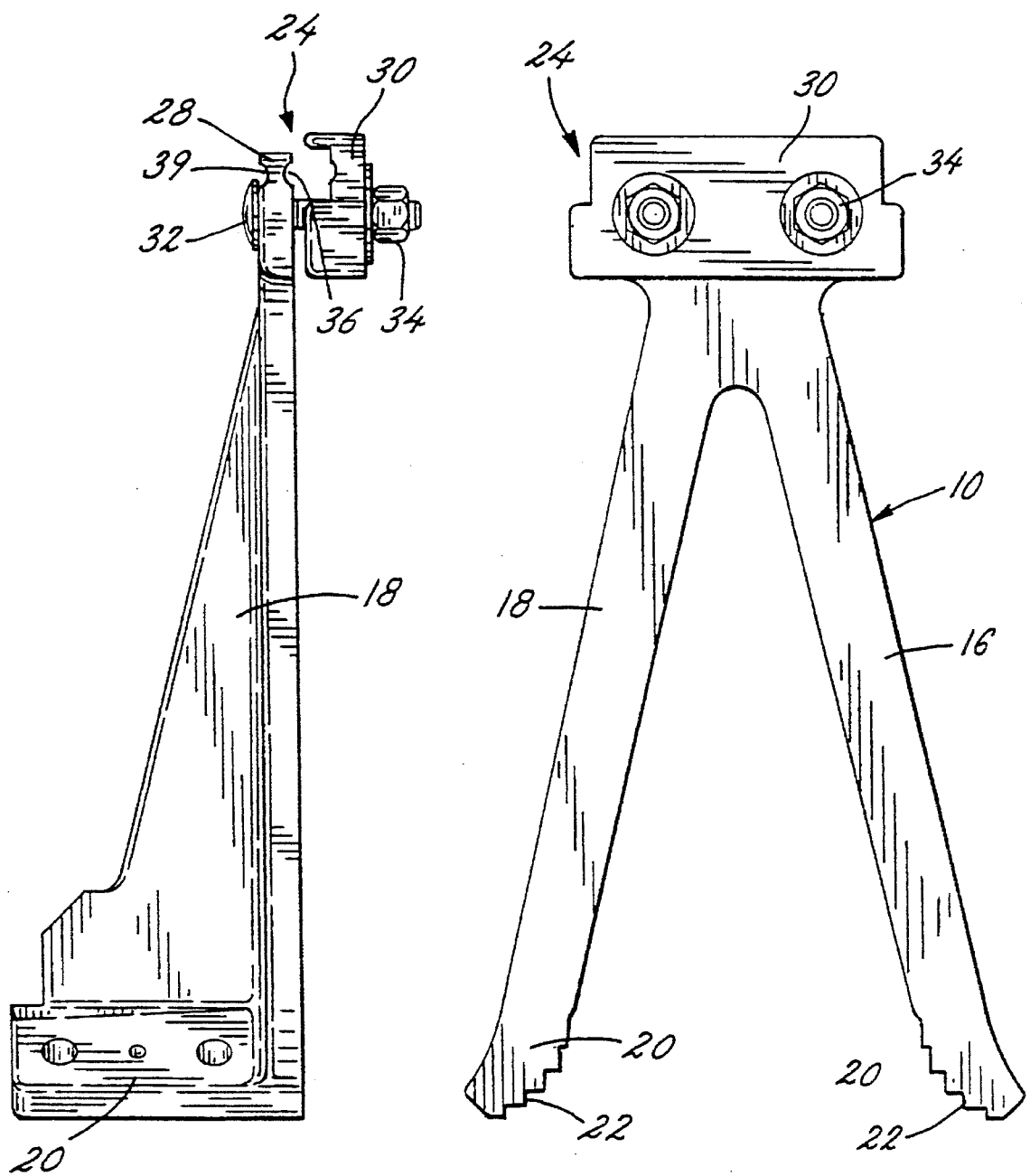
FIG. 3 is a side plan view of the support bracket shown in FIG. 1.
FIG. 4 is a top plan view thereof.
Figure 5:
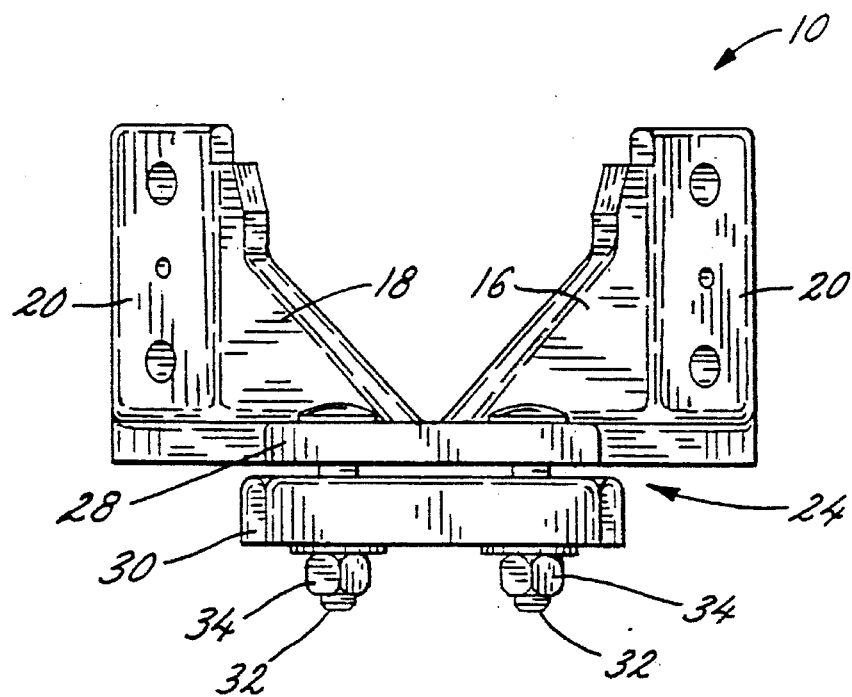
FIG. 5 is a front end view thereof.
Figure 6:
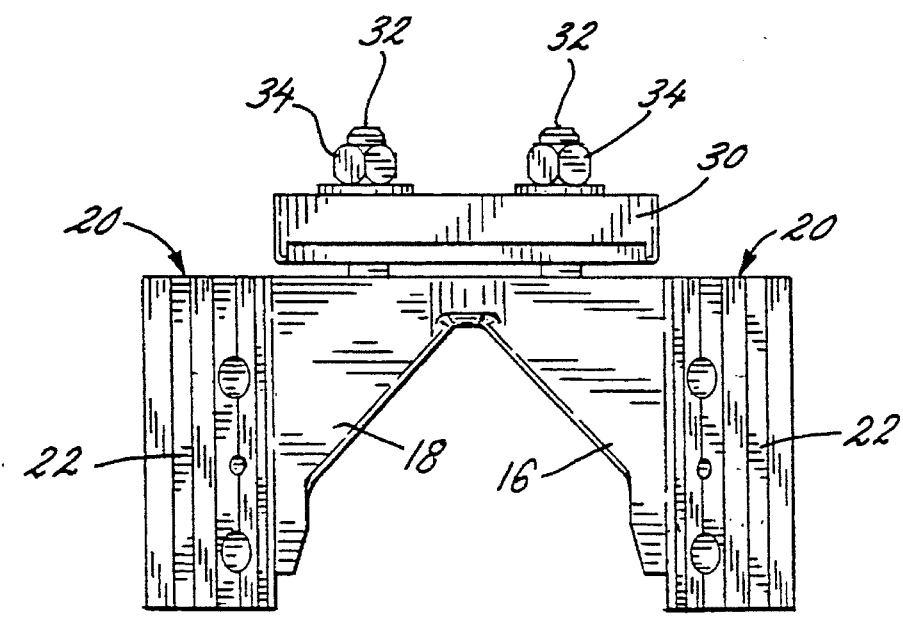
FIG. 6 is a rear end view thereof.
Figure 7:
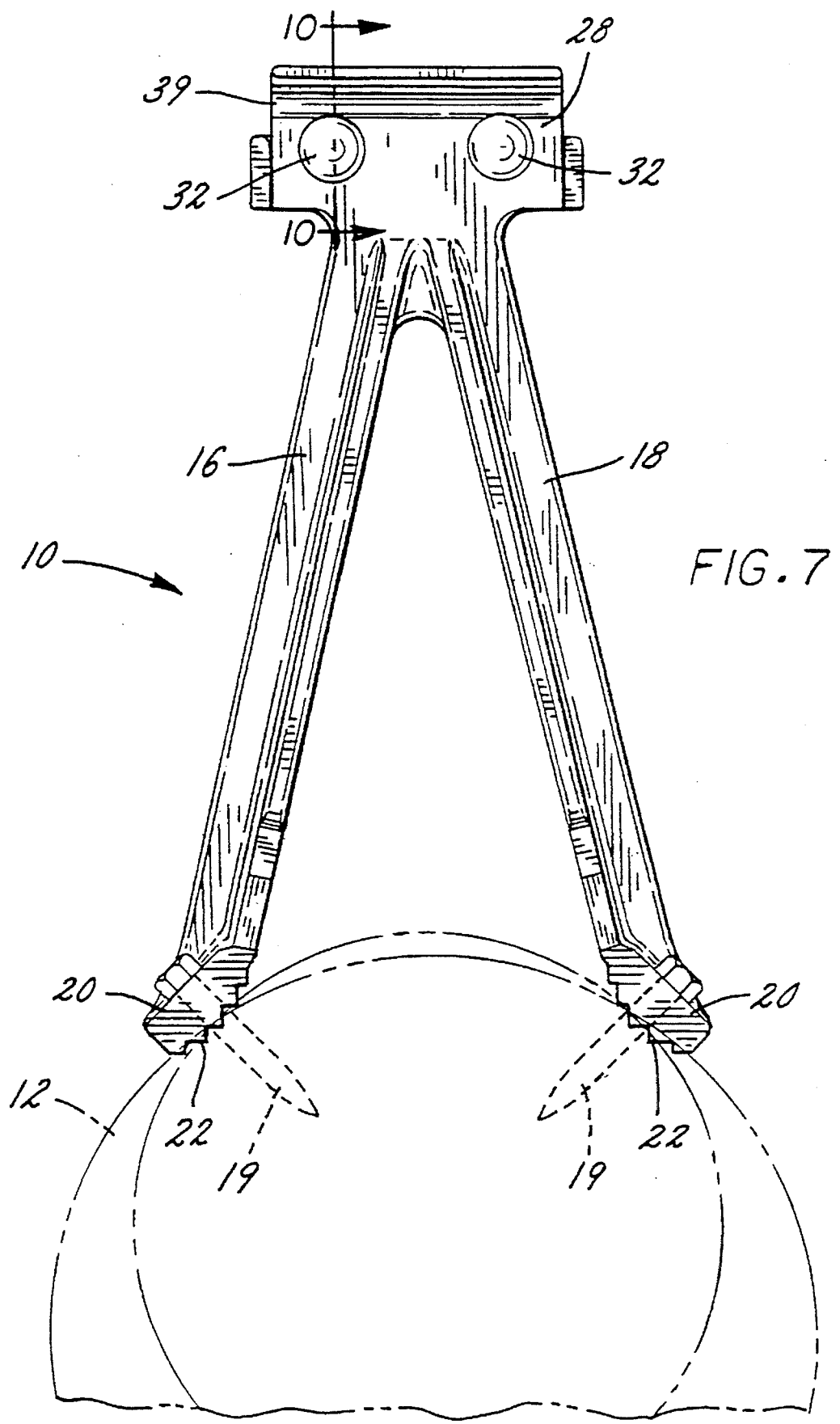
FIG. 7 is a bottom plan view showing the attachment to a pole and carrying a conductor.

Turning now to the drawings, FIGS. 1, 7 and 8 illustrate the cable support bracket, generally indicated at 10, which is mountable to a utility pole 12 for carrying a conductor cable 14. The support bracket is generally constructed with a pair of arms 16, 18 formed in a V shape with the ends of the arms terminating in a pair of diverging mounting flanges 20 which have suitable openings for receiving screw fasteners like lag bolts 19 and even nails 23 for holding in place when the bracket 10 is being installed to a utility pole (FIG. 8). In accordance with one of the aspects of the present invention, the mounting flanges are formed with a reverse curve and include ribs 22 on their inner surfaces. With the diverging shape having the reverse curve, the mounting flanges will allow the bracket to be stably mounting against various different size or diameter utility poles.

At the apex end of the bracket 10, there is provided a clamping means 24 which includes a lower transverse clamping member 28, here integrally formed with the arms and an upper clamping member 30 which is adjustably held to the lower clamping member 28 by threaded bolt 32 and nut fasteners 34. The clamping members are preferably held together by the screw fasteners in a pre-assembled form so that there are no loose parts when being used in the field with the bracket being simply attached to the utility pole and the wire can be placed between the jaws of the clamping members that are then tightened together by the bolt and nut fasteners.

In the preferred form of the clamping device, there is a groove 36 provided in the top lower clamping member for receiving the cable and holding it against horizontal movement. The upper movable clamping member 30 has depending lips 38 which will overlap the lower clamping member when tightened together to prevent the cable from readily moving out from between the clamping members. A groove 39 is provided on the underside of the lower clamping member 28 to enable reversing the clamping member 30 for attachment on the underside. The bracket can be then mounted in a reverse position to lower the cable when necessary.

Also in the preferred form, the mounting bracket elements are preferably made of aluminum magnesium castings which provide suitable durability and strength, yet are sufficiently light in weight that installers are not hampered by being able to carry the devices from supply to the installation site and ladders, as well as other devices used for access to utility poles.

The cross section of the arms for strength are given a generally T shape and to help the bracket from being obstructed from other types of brackets or encumbrances 42, particularly on a utility pole, there is a notch 40 provided to better assist in clearing such pole encumbrances.

Figure 11:
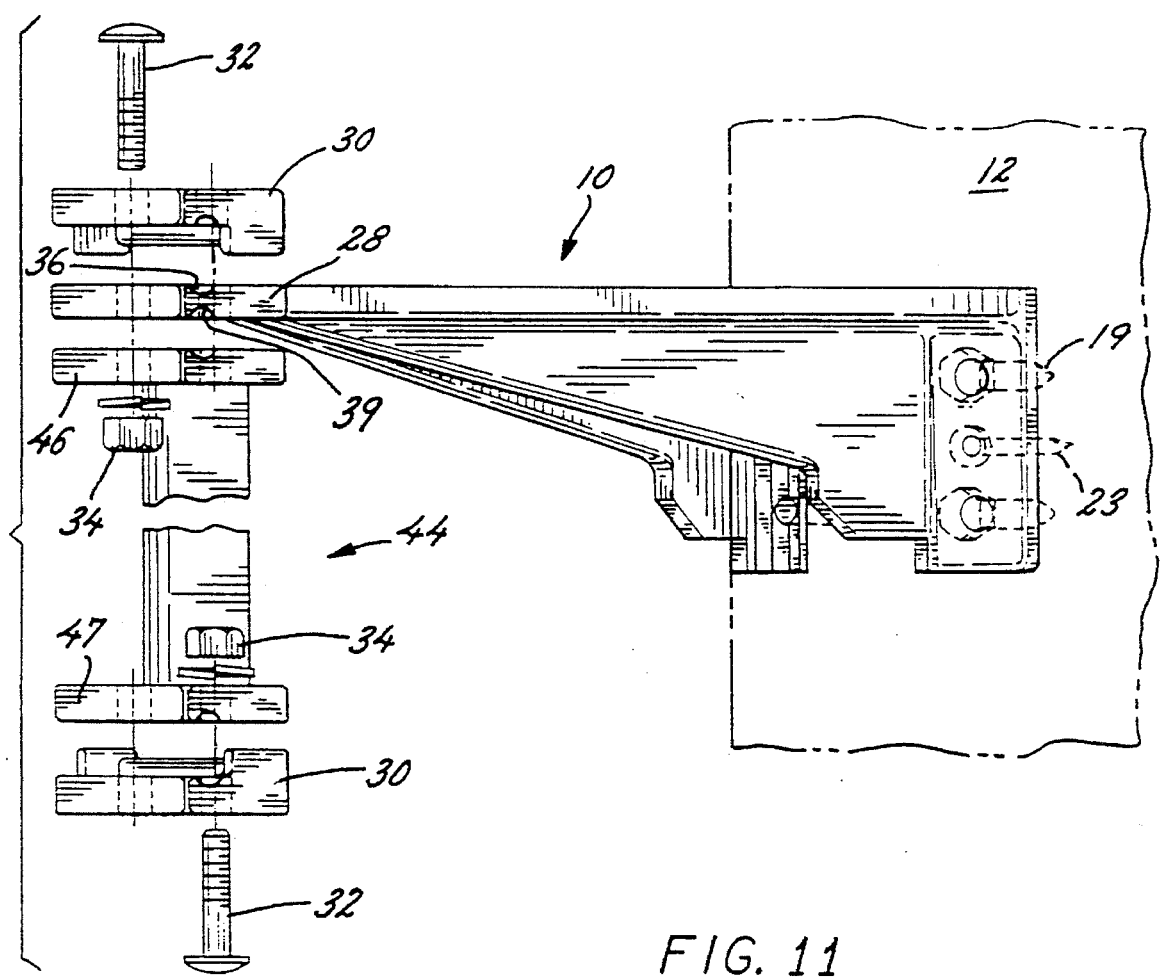
FIG. 11 is a side view similar to FIG. 8, here showing in exploded form the addition of an extension bracket and another clamping member.

Turning now to FIG. 11, an elongated extension arm bracket member 44 may be provided to direct the cable downward to avoid obstacles or for direction toward a cable subscriber house, for example. The arm bracket member 44 has a center section V-shaped in cross section (FIG. 14) and upper and lower plate members 46, 47 at respective ends which include apertures 48 are provided so that the arm member 44 can be reversibly bolted to the underside of the lower clamping member 28 of support bracket 10. In addition, one of the plate members 46, 47 whichever is the free end receives a clamping member 30 like the one used with bracket 10 to secure a cable. Each of the plate members 46, 47 preferably has a groove 50 for retaining a cable (FIGS. 12–16).

I claim:

1. A cable support bracket adapted to be mounted on a utility pole or the like, comprising in combination:

a pair of arms formed in a generally V-shape having outer ends and an apex portion;

the outer ends terminating in a pair of diverging mounting flanges adapted to receive fastening means for attaching said flanges to said pole;

the apex portion of said arms having first and second transverse clamping members, one of said clamping members being fixed to the arms and the second clamping member being adjustable movable to form a jaw for holding and clamping a cable between the first and second clamping members, the lower clamping member being fixed to the arms and the upper clamping member being attached to the lower member with threaded fastener means, and an elongated extension arm bracket secured to the lower clamping member.

2. A cable support bracket as claimed in claim 1 wherein said elongated extension arm bracket includes a center section having a V-shaped cross section and plate members at respective ends thereof.

3. A cable support bracket as claimed in claim 2 wherein the free end plate of said extension arm bracket receives a clamping member to hold a cable thereon.

* * * * *